United States Patent
Kratmann et al.

(10) Patent No.: US 10,024,298 B2
(45) Date of Patent: Jul. 17, 2018

(54) MOUNTING RING ARRANGEMENT

(71) Applicant: Siemens Aktiengesellschaft, Munich (DE)

(72) Inventors: Kasper Koops Kratmann, Horsens (DK); Karsten Schibsbye, Fredericia (DK)

(73) Assignee: SIEMENS AKTIENGESELLSCHAFT, Munich (DE)

(*) Notice: Subject to any disclaimer, the term of this patent is extended or adjusted under 35 U.S.C. 154(b) by 300 days.

(21) Appl. No.: 14/752,954

(22) Filed: Jun. 28, 2015

(65) Prior Publication Data
US 2016/0003215 A1 Jan. 7, 2016

(30) Foreign Application Priority Data
Jul. 4, 2014 (EP) .................................. 14175843

(51) Int. Cl.
*F03D 1/06* (2006.01)
*F03D 1/00* (2006.01)

(52) U.S. Cl.
CPC ............. *F03D 1/00* (2013.01); *F03D 1/0658* (2013.01); *F03D 1/0675* (2013.01);
(Continued)

(58) Field of Classification Search
CPC ........ F03D 1/00; F03D 1/0658; F03D 1/0675; F03D 1/065; F03D 1/066; F03D 1/0691;
(Continued)

(56) References Cited

U.S. PATENT DOCUMENTS 3,895,833 A * 7/1975 Thiessen ............... F16L 23/02
285/111
4,915,590 A * 4/1990 Eckland ............... F03D 1/0658
29/889.21
(Continued)

FOREIGN PATENT DOCUMENTS

EP 2014449 A1 1/2009
EP 2283995 A1 2/2011
(Continued)

*Primary Examiner* — Kenneth Bomberg
*Assistant Examiner* — Brian Delrue
(74) *Attorney, Agent, or Firm* — Beusse Wolter Sanks & Maire

(57) ABSTRACT

A mounting ring arrangement adapted for alignment of root bushings in a rotor blade root end during a rotor blade assembly step includes a mounting ring segment; and a partial mounting ring, which partial mounting ring is a closed annular component and includes a recess dimensioned to accommodate the mounting ring segment. A method of manufacturing a rotor blade, includes (A) arranging a fiber layup in a first blade mold and arranging a fiber layup in a second blade mold; (B) arranging the partial mounting ring of a mounting ring arrangement in the first blade mold and arranging the mounting ring segment of the mounting ring arrangement in the second blade mold; and (C) joining the first and second blade molds such that the partial mounting ring and the mounting ring segment join to form a full mounting ring.

20 Claims, 8 Drawing Sheets

(52) U.S. Cl.
CPC ....... *F05B 2240/302* (2013.01); *Y02E 10/721* (2013.01); *Y02P 70/523* (2015.11)

(58) Field of Classification Search
CPC .. F03D 13/10; F05B 2240/302; Y02P 70/523; Y02E 10/721
USPC ............ 416/204 R; 29/889.71; 285/202, 208
See application file for complete search history.

(56) References Cited

U.S. PATENT DOCUMENTS

| | | | | |
|---|---|---|---|---|
| 5,439,353 | A | * | 8/1995 | Cook ...................... B29C 70/86 416/229 R |
| 5,951,066 | A | * | 9/1999 | Lane ........................ E21B 33/03 285/364 |
| 7,352,075 | B2 | * | 4/2008 | Willey ................... F03D 7/0224 290/44 |
| 7,478,843 | B2 | * | 1/2009 | Dole ................... F16L 19/0283 285/148.28 |
| 8,382,440 | B2 | * | 2/2013 | Baker .................... F03D 1/0675 416/226 |
| 9,068,559 | B2 | * | 6/2015 | Hancock ................. B29C 70/30 |
| 9,132,590 | B2 | * | 9/2015 | Frydendal ............. B29C 33/424 |
| 9,180,630 | B2 | * | 11/2015 | Madsen .................. F03D 1/065 |
| 9,370,905 | B2 | * | 6/2016 | Moeller Larsen ...... B29C 70/46 |
| 9,410,529 | B2 | * | 8/2016 | Grove-Nielsen ....... F03D 1/001 |
| 9,738,458 | B2 | * | 8/2017 | Schmidt ................. B65G 47/82 |
| 2005/0106029 | A1 | * | 5/2005 | Kildegaard ........... B29C 70/525 416/229 R |
| 2008/0310964 | A1 | * | 12/2008 | Llorente Gonzalez . B29C 70/44 416/226 |
| 2010/0290912 | A1 | * | 11/2010 | Sorensen ............... F03D 1/0658 416/204 R |
| 2011/0020131 | A1 | * | 1/2011 | Petersen ............ B29D 99/0025 416/226 |
| 2011/0044817 | A1 | * | 2/2011 | Bendel ................. F03D 1/0658 416/204 R |
| 2012/0045343 | A1 | * | 2/2012 | Hancock ................. B29C 70/30 416/226 |
| 2012/0093656 | A1 | * | 4/2012 | Esaki ................... F03D 1/0675 416/229 R |
| 2013/0129519 | A1 | * | 5/2013 | Nielsen ................. F03D 1/0633 416/228 |
| 2013/0296062 | A1 | * | 11/2013 | Arnstein ................ G01P 1/026 464/51 |
| 2014/0028138 | A1 | * | 1/2014 | Feher ..................... F03D 1/001 310/156.08 |
| 2014/0030094 | A1 | * | 1/2014 | Dahl ..................... B29C 70/885 416/217 |
| 2014/0186153 | A1 | * | 7/2014 | Baun ..................... F03D 7/0224 415/1 |
| 2014/0377078 | A1 | * | 12/2014 | Bagepalli .............. F03D 1/0675 416/241 R |
| 2015/0167632 | A1 | * | 6/2015 | Gil Molla ............... F03D 1/065 416/204 R |
| 2015/0233260 | A1 | * | 8/2015 | Garm ................... F03D 1/0658 416/204 A |
| 2015/0337797 | A1 | * | 11/2015 | Grove-Nielsen ....... F03D 1/001 416/204 R |
| 2016/0123306 | A1 | * | 5/2016 | Minadeo ............... F03D 1/0658 416/174 |
| 2016/0146185 | A1 | * | 5/2016 | Yarbrough ........... F03D 1/0675 416/230 |
| 2016/0251818 | A1 | * | 9/2016 | Thomsen ............... E02D 27/425 52/297 |
| 2016/0290313 | A1 | * | 10/2016 | Zwart ................... F03D 1/0658 |
| 2016/0377048 | A1 | * | 12/2016 | Caruso ................... B23P 15/04 29/889.71 |
| 2016/0377051 | A1 | * | 12/2016 | Caruso ............... B29D 99/0025 416/226 |
| 2016/0377052 | A1 | * | 12/2016 | Caruso ................. F03D 1/0675 416/226 |
| 2017/0045032 | A1 | * | 2/2017 | Jacobsen ............... F03D 1/0658 |

FOREIGN PATENT DOCUMENTS

| | | |
|---|---|---|
| EP | 2532880 A2 | 12/2012 |
| WO | WO 2007054088 A1 | 5/2007 |
| WO | 2012010331 A1 | 1/2012 |
| WO | 2012097394 A1 | 7/2012 |
| WO | 2013061016 A1 | 5/2013 |
| WO | 2014076183 A1 | 5/2014 |

* cited by examiner

FIG 2
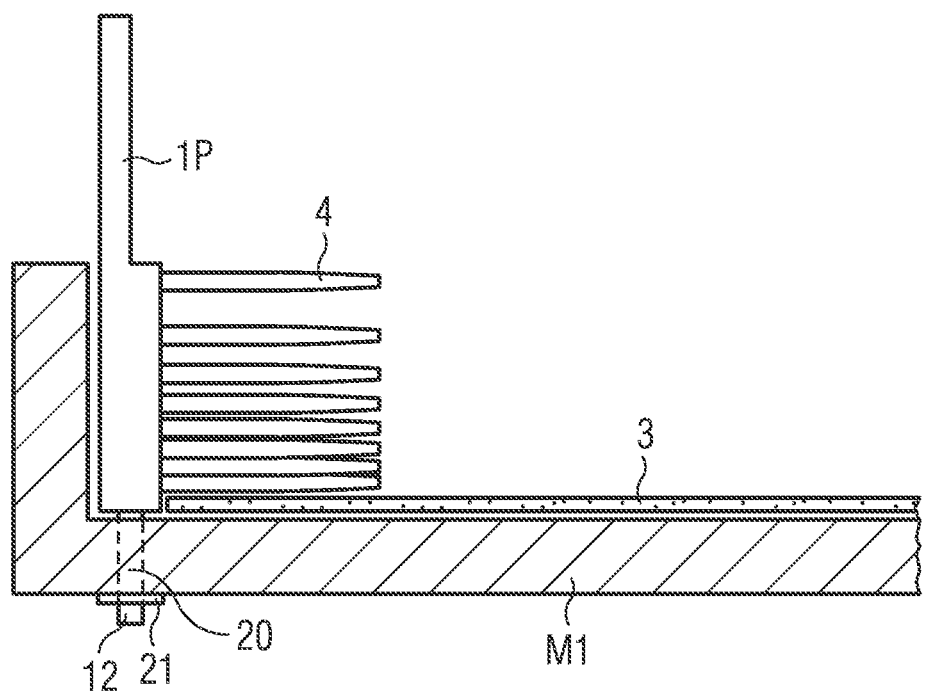
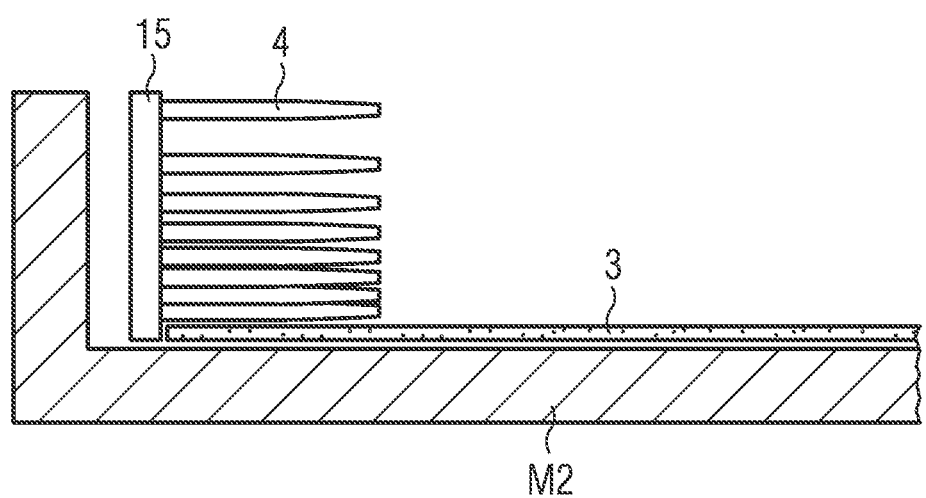

FIG 8
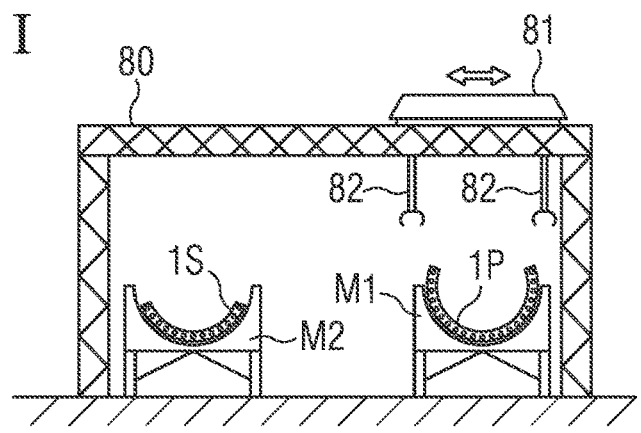
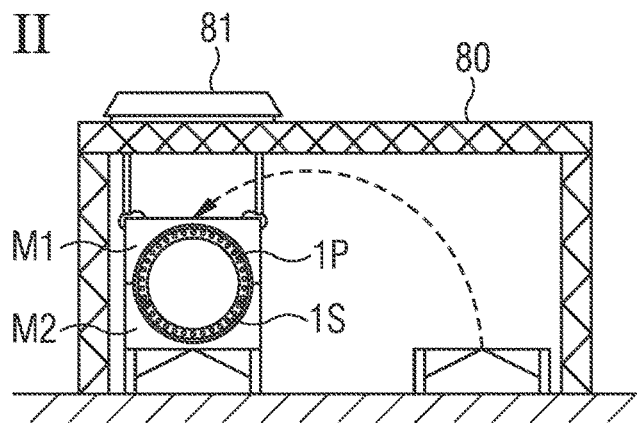
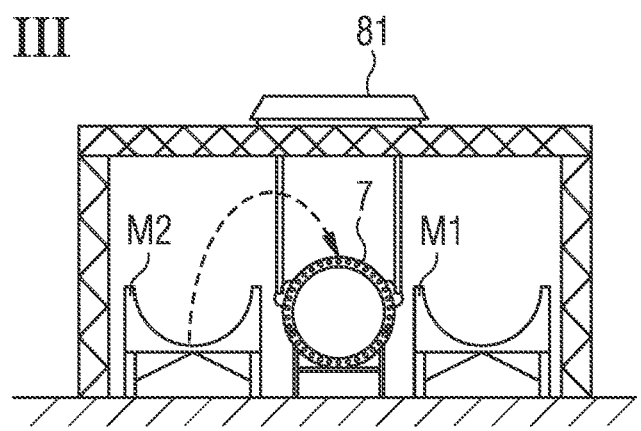

MOUNTING RING ARRANGEMENT

CROSS REFERENCE TO RELATED APPLICATIONS

This application claims the benefit of European Application No. EP14175843 filed Jul. 4, 2014 incorporated by reference herein in its entirety.

FIELD OF INVENTION

The invention describes a mounting ring arrangement and a method of manufacturing a wind turbine rotor blade.

BACKGROUND OF INVENTION

A wind turbine rotor blade comprises an airfoil shape over much of its length, and usually has a circular root end for connecting to a circular pitch bearing on the wind turbine hub. A rotor blade is generally manufactured by arranging layers of fibre material in two blade halves, and joining these blade halves together. Root bushings are embedded in the root end, so that fasteners such as bolts can be used later on to mount the rotor blade to the hub. Resin infusion can be performed in a vacuum-assisted resin transfer moulding (VARTM) step to obtain a structurally sound and relatively light blade. In a manufacturing process in which the blade halves are joined before performing resin infusion, it is critical to ensure that an accurate arrangement of the root bushings, so that the rotor blade can later be mounted to a pitch bearing of a wind turbine hub. To this end, a mounting ring can be used to assist in ensuring that the root end meets the required manufacturing tolerances. Such a mounting ring can be temporarily connected to some or all of the root bushings in order to hold them in place while the blade is being completed. The root bushings can be connected to the mounting ring, and the entire assembly can be lowered into a blade half. However, a circular or one-piece mounting ring is associated with added complexity in the process of arranging fibre material between the root bushings mounted on the ring.

One approach can be to manufacture the mounting ring as two ring segments or ring halves. The first ring segment is arranged in one mould half, and the second ring segment is placed in the other mould half. After completion of a fibre layup step, and arranging fibre material between the root bushings, one mould half is turned and lowered onto the other mould half so that the mould can be closed for the subsequent infusion and curing steps. One problem with this solution is that placement of the ring halves need to be performed very accurately, otherwise compression or shifting of the fibre material may result when the blade mould halves are joined, since the mounting ring halves may push or compress the fibre material.

Furthermore, it may be difficult to accurately align the two mounting ring halves when the blade moulds are joined together. Even a small misalignment between the two mounting ring halves or a slight offset of a ring half is highly undesirable. If the two ring halves are not exactly aligned and planar when the first and second mould halves are joined, the result can be a defective root end, so that the entire rotor blade may be useless. For this reason, the conventional mounting ring halves are associated with relatively high level of effort to ensure accuracy during manufacture of the mounting ring halves, during placement of the mounting ring halves in the mould, during the blade mould joining steps, etc. Therefore, the conventional mounting ring halves are also associated with correspondingly high manufacturing costs.

SUMMARY OF INVENTION

It is therefore an object of the invention to provide an improved way of joining two half blade components in a rotor blade manufacturing step, avoiding the problems described above.

This object is achieved by a mounting ring arrangement; by a method of of manufacturing a rotor blade; and by a rotor blade as claimed.

According to aspects of the invention, the mounting ring arrangement is realised for the alignment of root bushings in a wind turbine rotor blade root end during a rotor blade assembly step, and comprises a mounting ring segment realised for placement in a first blade mould; and a partial mounting ring realised for placement in a second blade mould, which partial mounting ring is realised as a closed annular component and comprises a recess dimensioned to accommodate the mounting ring segment.

In the context of embodiments of the invention, the term "mounting ring segment" is to be understood as an element comprising a portion or segment of an annular ring-shaped element, whereas the term "partial mounting ring" is to be understood as a ring-shaped element that is to some extent "incomplete"; when fitted together, the mounting ring segment and the partial mounting ring give a complete or "full" mounting ring. In particular, the depth of the recess corresponds to the thickness of the mounting ring segment, so that the complete mounting ring has an essentially uniform thickness throughout. As described above, a mounting ring is used in the manufacture of a rotor blade at the stage when an upper blade half is joined to a lower blade half. As described above, the mounting ring fulfils an important function in ensuring a geometrically accurate placement of root bushings.

An advantage of the mounting ring arrangement according to aspects of the invention is that it can ensure a favourably accurate geometrical arrangement of the root bushings, while allowing a relatively straightforward manufacturing process.

According to aspects of the invention, the method of manufacturing a rotor blade includes (A) arranging a fibre layup in a first blade mould and arranging a fibre layup in a second blade mould; (B) arranging the mounting ring segment of a mounting ring arrangement according to the invention in the first blade mould and arranging the partial mounting ring of the mounting ring arrangement in the second blade mould; and (C) joining the first and second blade moulds such that the partial mounting ring and the mounting ring segment join to form a complete mounting ring.

An advantage of the method according to aspects of the invention is that a high degree of accuracy regarding the planar alignment of the mounting ring segment and partial mounting ring is easily achieved. As a result, the geometrical positions of the root bushings can be ensured to a favourably high position tolerance. Furthermore, the fibre layup can be prepared to a high degree of accuracy before joining the blade moulds in preparation for a resin infusion step. Such a high degree of accuracy in the various stages of manufacture is very difficult to achieve with the known approach of using two ring halves. The manufacturing stages of the method according to the invention can be performed more quickly without making any concessions regarding accuracy, so that the manufacture of the rotor blade can be less time-consuming and more cost-effective.

According to aspects of the invention, the rotor blade is manufactured using the method according to the invention and/or a rotor blade mould according to the invention.

An advantage of the rotor blade according to aspects of the invention is that it can be manufactured to a high degree of exactness, with an accurate and precise embedding of root bushings in the rotor blade root end. Furthermore, defects such as fibre compression or resin pooling can be avoided when blade halves are joined to complete the rotor blade according to the invention.

Particularly advantageous embodiments and features of the invention are given by the dependent claims, as revealed in the following description. Features of different claim categories may be combined as appropriate to give further embodiments not described herein.

The mounting ring segment and the corresponding recess in the partial mounting ring can be realised to subtend any suitable angle. However, in another embodiment of the invention, the mounting ring segment extends over an angular range of at least 90°, more particularly at least 120°. The mounting ring segment is essentially a segment of the full mounting ring, so that it shares the same centre or origin. For example, a mounting ring segment may subtend an angle of 160° from end to end. In particular, the corresponding recess in the partial mounting ring subtends essentially the same angle, allowing sufficient tolerance to ensure that the recess accommodates or fits about the mounting ring segment. Advantageously, the angle subtended by the mounting ring segment and the partial mounting ring is at most 200°.

Before placing the mounting ring segment or the partial mounting ring into their respective blade moulds, a plurality of root bushings is secured to the mounting ring arrangement. To this end, fasteners such as bolts can be used to secure root bushings firmly to the mounting ring segment and the partial mounting ring. Advantageously, the mounting ring segment and the partial mounting ring are prepared with threaded and unthreaded holes to accommodate fasteners similar to those that will later be used to secure the finished blade to the pitch bearing. For example, a fastener used to secure a root bushing to the mounting ring segment or the partial mounting ring can comprise a hex bolt, a stud bolt or similar.

As described above, one "upper" blade half may be lowered onto the other "lower" blade half in order to assemble the blade. Therefore, to prevent the mounting ring part from falling out of the upper blade half as it is turned over, it may be secured in some way to the upper blade mould. In a further embodiment of the invention, the partial mounting ring is equipped with an interface connector, which can be inserted into a corresponding opening or through-hole in the upper blade mould. For example, the interface connector can be formed as an outwardly protruding pin during casting of the partial mounting ring. The pin can fit through a corresponding hole in the blade mould, and can be realised so that a retainer, mounted to the pin on the outside of the blade mould, serves to keep the partial mounting ring in place as the upper blade mould is turned over and lowered into place on the lower blade mould.

As indicated above, the mounting ring need only be used during the final manufacturing stages of the blade. Once the blade is cured, finished and ready for transport to a storage or installation site, the mounting ring can be removed. Removal of a mounting ring can be difficult if it has been exposed to resin during the infusion and curing stages and has therefore "bonded" to the body of the blade. Damage to the blade body may result. Therefore, the method according to the invention advantageously comprises the step of applying a release agent or coating e.g. a plastic release agent, an adhesive release agent, a silicon base release agent, a wax or ceramic coating or any other suitable coating to the mounting ring arrangement prior to performing a resin infusion step. Such an agent or coating allows removal of the mounting ring without damaging the body of the cured blade.

The mounting ring segment and the partial mounting ring can be realised to fit together in a close-fitting manner. A careful placement of the mounting ring segment and the partial mounting ring, and a careful lowering into place of the upper blade mould may be sufficient to ensure that the mounting ring segment and the partial mounting ring align to give a satisfactory root bushing placement in the blade. However, in a further embodiment of the invention, the mounting ring arrangement comprises a connecting means for connecting the mounting ring segment to the partial mounting ring to complete the full mounting ring. The connecting means allows a physical joining of the mounting ring segment to the partial mounting ring before the resin infusion step is performed. In this way, a very accurate arrangement of the root bushings can be ensured, so that these are embedded to the necessary levels of tolerance in the blade root end. In a further embodiment of the invention, the connecting means comprises a first guide formed in the mounting ring segment and a corresponding second guide formed in the partial mounting ring, wherein the second guide is arranged to align with the first guide. For example, the guide pair can comprise two aligned bores so that a fastener can be inserted through a first guide formed the body of the partial mounting ring and into a second guide formed in the body of the mounting ring segment.

In a further embodiment of the invention, a first type of connecting means comprises a guide bolt for aligning the mounting ring segment to the partial mounting ring. Such an alignment is advantageously performed before securing the mounting ring segment to the partial mounting ring. To this end, a guide bolt can have a body with an overall length somewhat shorter than the total thickness of the mounting ring. A first bore or guide can be formed as a through-hole through the partial mounting ring, and may also have a countersunk cavity to accommodate a hex bolt head. A second bore or guide can be formed in the mounting ring segment to receive the end of the guide bolt. The first bore can be threaded to correspond to a threaded portion in the upper region of the guide bolt. When one or more such guide bolts are inserted into first bores, their pointed or conical outer ends "seek" the second bores, and can "nudge" the mounting ring segment—if necessary—into alignment with the partial mounting ring.

In a further embodiment of the invention, a second type of connecting means comprises a tightening bolt for securing the mounting ring segment to the partial mounting ring. Similar to the case for the first type of connecting means, a first bore can be formed in the partial mounting ring, and a second bore can be formed in the mounting ring segment. In this case, however, the second bore is advantageously threaded to match a threaded portion on the end of the tightening bolt, while the first bore need not have any threaded portion. Advantageously, a second bore formed in the mounting ring segment is not a through-hole, but only extends partway into the body of the mounting ring segment. In a further embodiment, the functions of a guiding bolt and a tightening bolt could be fulfilled by a single type of bolt connection.

The act of inserting guide bolts into their first and second bores will bring the mounting ring segment into position with the partial mounting ring, as described above. Then, the act of threading one or more tightening bolts into their now aligned first and second bores will result in the mounting ring segment being "pulled" towards the partial mounting ring and securely fastened to the partial mounting ring. In particular, at least two pairs of first and second bores for guide bolts, and at least two pairs of first and second bores for tightening bolts, are formed in the elements of the mounting ring arrangement. For example, for a mounting ring with a mounting ring segment span of 160°, bores for four guide bolts and six tightening bolts can be machined in the partial mounting ring and mounting ring segment.

After the rotor blade has been completed, i.e. after the resin infusion and curing steps have been carried out, the hardened blade can be removed from the mould. The mounting ring arrangement can then be removed. To this end, the tightening bolts may first be removed. Then, the bolts can be removed from the root inserts of the partial ring segment. At this stage, the partial ring segment can be disconnected from the mounting ring segment. To facilitate this step, the guide bolts can be removed from their bores, and a corresponding number of "push bolts" can be inserted into the guide bolt bores. A push bolt has the same threaded portion as a guide bolt, but has a longer end or tip so that, when threaded into the guide bolt bore, its end section pushes into the mounting ring segment, effectively forcing the partial mounting ring outward from the mounting ring segment.

The significance of fibre compression in the root region of the blade has been mentioned above, and the negative consequences have been explained. The mounting ring arrangement according to the invention effectively avoids such fibre compression between bushings when joining the blade mould halves. In a further embodiment of the invention, the mounting ring segment is arranged in the first blade mould at a distance offset from its final position in the complete mounting ring. In other words, the mounting ring segment is arranged in its blade half so that, when the partial mounting ring is lowered into place, a small gap remains. This intentional gap ensures that the partial mounting ring cannot—even inadvertently—nudge or push the mounting ring segment when the upper blade half is being lowered into place. This ensures that the risk of fibre distortion can be even further reduced.

Advantageously, the thickness of the full mounting ring corresponds to the thickness of the pitch bearing to which the rotor blade will later be attached. Such a pitch bearing can have a thickness of in the range of 240 mm. Therefore, the partial mounting ring may comprise such a thickness over its "non-recess" part, while the recess part together with the mounting ring segment also comprise this thickness. For example, for a pitch bearing with a thickness of 240 mm, the partial mounting ring can have a thickness of 240 mm over its thickest, "non-recess portion", and a thickness of 180 mm over its thinner "recess portion". The corresponding mounting ring segment may then have a thickness of 60 mm, so that the full mounting ring has an overall thickness of 240 mm.

The thickness of the mounting ring segment (and therefore also the thickness of the "recess portion" of the partial mounting ring) can be chosen on the basis of the material from which it is made, and any minimum thickness for the mounting ring segment to be able to support an arrangement of root bushings. Advantageously, the thickness of the mounting ring segment comprises at least 10%, more particularly at least 20% of the thickness of the full mounting ring. For example, the ratio of the thicknesses of the mounting ring segment and the "recess portion" of the partial mounting ring can be 1:3, so that the thickness of the mounting ring segment comprises 25% of the full mounting ring. The mounting ring arrangement can be made of steel. Alternatively, the partial mounting ring and/or the mounting ring segment can be made of a synthetic material such as polypropylene. Various materials can be combined, for example the partial mounting ring and/or the mounting ring segment can comprise a steel core covered with a synthetic material such as polypropylene.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

FIG. 2 shows a first stage in the manufacture of a wind turbine rotor blade according to the invention;

FIG. 8 shows a number of stages in an embodiment of the method according to the invention;

DETAILED DESCRIPTION OF INVENTION

In the diagrams, like numbers refer to like objects throughout. Objects in the diagrams are not necessarily drawn to scale.

Figure 1:
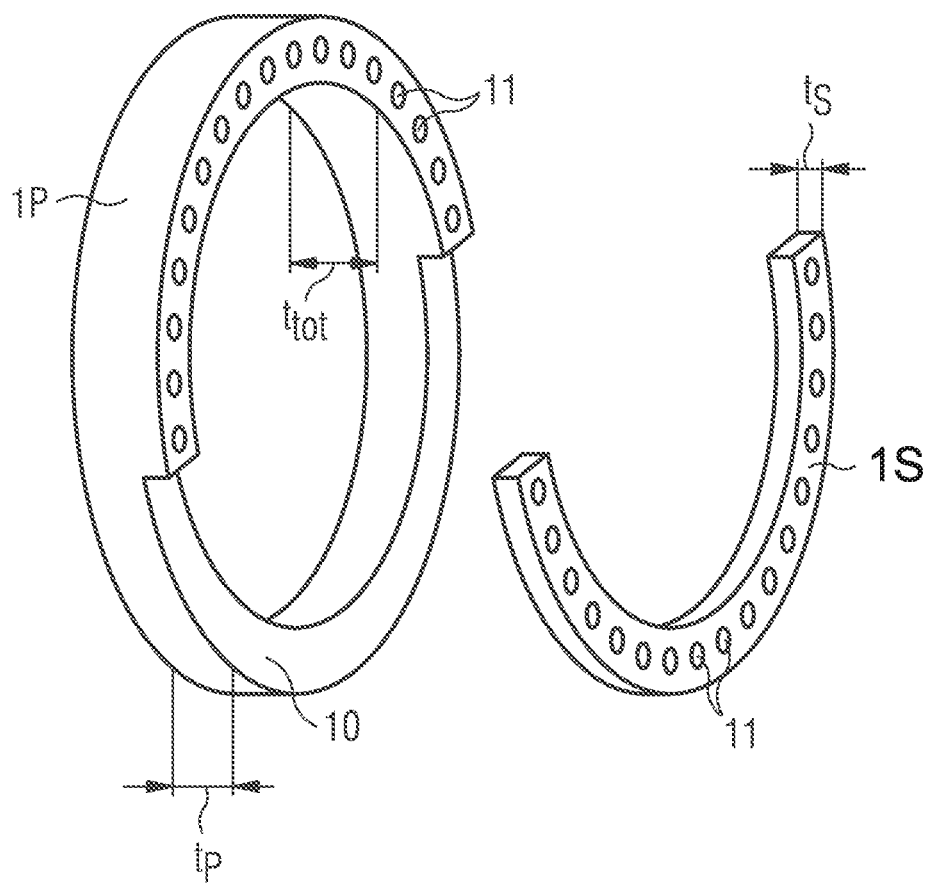
FIG. 1 shows a first embodiment of a mounting ring arrangement according to the invention.

FIG. 1 shows a first embodiment of a mounting ring arrangement 1P, 1S according to the invention. The mounting ring arrangement 1P, 1S comprises a partial mounting ring 1P and a mounting ring segment 1S, which fit together to give a complete mounting ring. To this end, the partial mounting ring 1P has a recess 10 or "step" whose shape and depth $t_P$ corresponds to the shape and thickness $t_S$ of the mounting ring segment 1S. In this exemplary embodiment, the mounting ring segment 1S subtends an angle of about 180°, so that its shape (and the shape of the recess 10) corresponds to a semi-circle.

FIG. 2 shows a perspective view illustrating a first stage in the manufacture of a wind turbine rotor blade according to the invention. The diagram shows a first or "upper" mould M1, in which fibre material 3 for one half of a rotor blade has been laid in a fibre layup procedure. An arrangement of root bushings 4 has previously been connected to a partial mounting ring 1P, which has then been placed into the root end of the mould M1. Although not shown in the diagram for the sake of clarity, fibre material is also arranged about the bushings 4 and/or in the spaces between the bushings 4. A number of fasteners (not shown) are inserted through the partial mounting ring 1P and into the root bushings 4 to secure the root bushings 4 firmly to the partial mounting ring 1P. This step is indicated in the diagram by the broken lines (only for two bushings for the sake of clarity). The fasteners used for this purpose may have the same thickness as the fasteners that will later be used to connect the rotor blade to the hub of a wind turbine. In this exemplary embodiment, the outer end or bolt head of each fastener is covered by a protective cap 42 to prevent any resin from creeping into the bushing 4 during the infusion process. The protective cap 42 can be made of a suitable material such as silicone, since this can easily be removed later (when the mounting ring arrangement is to be dismounted from the finished blade).

A connecting pin 12 of the partial mounting ring 1P has been inserted into a corresponding opening 20 in the mould M1 and secured by a retainer 21. The connecting pin 12 serves to align the partial mounting ring 1P in the mould M1, and also to prevent the partial mounting ring 1P from slipping out of the mould M1 when this upper mould M1 is later inverted and placed onto a lower mould in preparation for the infusion and curing stages. The diagram also shows such a "lower" mould M2, in which fibre material 3 for the other blade half has been laid in the mould M2. Here also, an arrangement of root bushings 4 has previously been connected to a mounting ring segment 1S, which has then been placed into the root end of the lower mould M2. A space is left between the mounting ring segment 1S and the end of the mould M2, in order to leave room for the partial mounting ring 1P, and the mounting ring segment 1S is placed so that a small gap will remain between it and the partial mounting ring 1P, as will be explained below.

In each case, the root bushings 4 can be precisely arranged relative to the fibre layup 3, and vice versa, since any unsatisfactory fibre thickness in the region of the root bushings 4 is immediately obvious at this stage of the manufacturing process and can be corrected if necessary.

Figure 3:
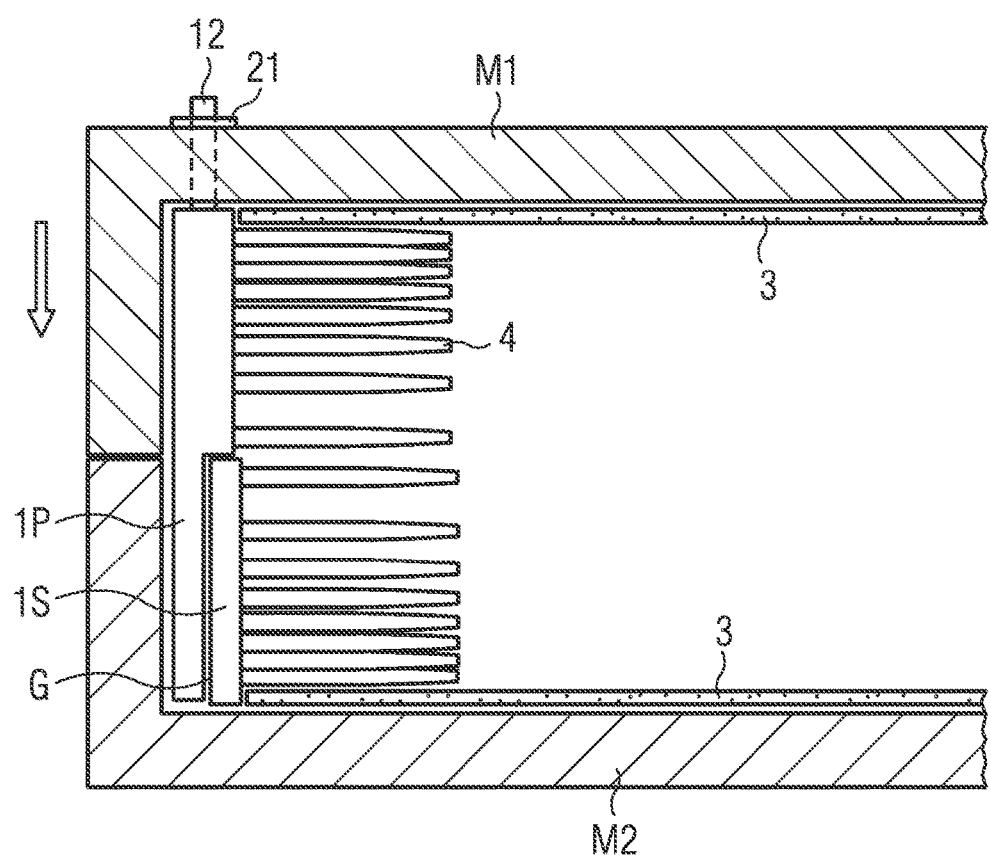
FIG. 3 shows a second stage in the manufacture of a wind turbine rotor blade according to the invention.
Figure 4:
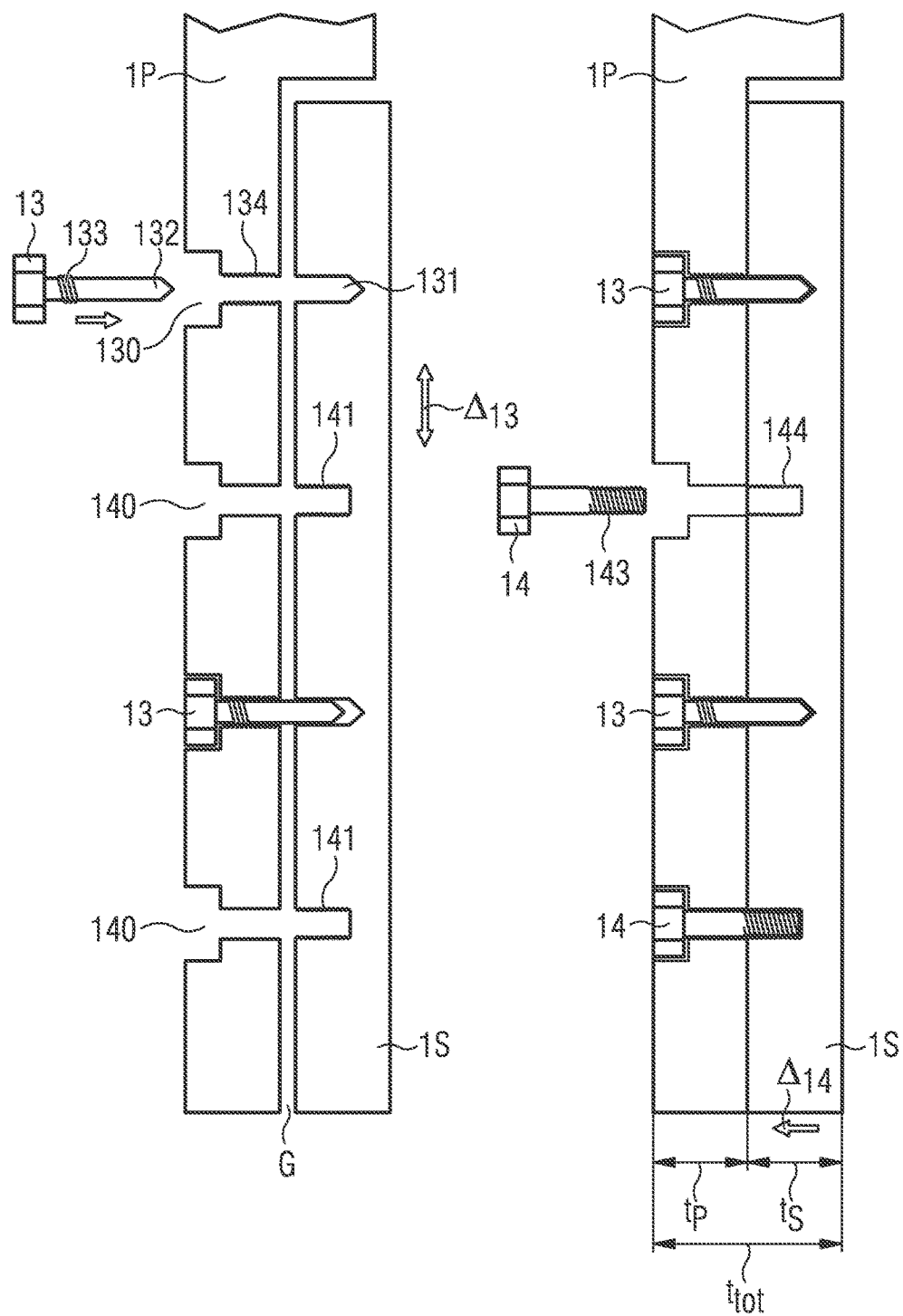
FIG. 4 shows a third stage in the manufacture of a wind turbine rotor blade according to the invention.

FIG. 3 shows a second stage in the manufacture of a wind turbine rotor blade according to the invention. Here, the upper mould M1 is being lowered into place on the lower mould M2 in order to close the moulds M1, M2. The placement of mounting ring segment 1S, intentionally leaving a small gap G between it and the partial mounting ring 1P, ensures that the partial mounting ring 1P will not touch the mounting ring segment 1S during this stage of closing the moulds M1, M2, and an undesirable compression or displacement of the fibre layer 3 by the mounting ring segment 1S is neatly avoided. Access openings (not shown) in the vertical end faces of the moulds allow access to the end face of the partial mounting ring 1P so that this can be connected to the mounting ring segment 1S. This is illustrated by FIG. 4, which shows a cross-section through the mounting ring arrangement 1P, 1S, indicating a number of hole or bore pairs for guide bolts 13 and tightening bolts 14. For clarity, the root bushings, moulds, and fibre layers are not shown here.

A guide bolt 13 is inserted into a first guide bolt bore 130 or through-hole 130 and into a second guide bolt bore 131. This is demonstrated on the left-hand side of the diagram. The guide bolt 13 has a pointed or conical end 132, which can "seek" the second bore 131. The guide bolt 13 also has a threaded portion 133 to match a threaded portion 134 of the first guide bolt bore 130. In this exemplary embodiment, the first guide bolt bore 130 has a countersunk end portion to accommodate the head of the guide bolt 13.

Any misalignment of the mounting ring segment 1S relative to the partial mounting ring 1P will be corrected when several such guide bolts 13 are inserted into the guide bolt bores 130, 131, as indicated by the arrow $\Delta_{13}$.

In a subsequent step, the mounting ring segment 1S is "pulled" towards the partial mounting ring 1P. This is achieved by a number of tightening bolts 14 inserted into tightening bolt bores 140, 141. This is demonstrated on the right-hand side of the diagram. A first bore 140 through the partial mounting ring 1P is realised as a smooth through-hole with a countersunk head to accommodate the head of the tightening bolt 14. A second bore 141 has a threaded portion 144 to match a threaded portion at the end of the tightening bolt 14. When a tightening bolt 14 is inserted through the bores 140, 141 (aligned in the previous step by the guide bolts 13) and tightened, this acts to pull the mounting ring segment 1S towards the partial mounting ring 1P as indicated by the arrow $\Delta_{14}$. The combined thicknesses $t_P$, $t_S$ of the partial mounting ring 1P and mounting ring segment 1S now give the total mounting ring thickness $T_{tot}$.

The steps of inserting the bolts 13, 14 and tightening them can be performed through an access means in the mould end faces M1, M2 as mentioned above, such as a removable end cover which can be replaced before performing the infusion and curing steps.

Figure 5:
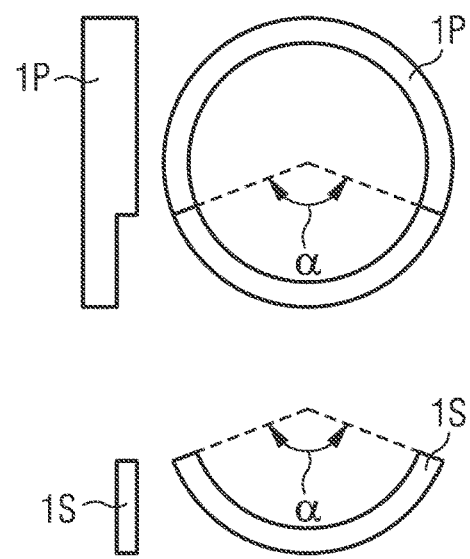
FIG. 5 shows a second embodiment of the mounting ring arrangement according to the invention.

FIG. 5 shows a second embodiment of the mounting ring arrangement 1P, 1S according to the invention. Here, the mounting ring segment 1S subtends an angle α of about 135°, so that its shape (and the shape of the recess 10) describes an arc that is shorter or less than a semi-circle.

Figure 6:
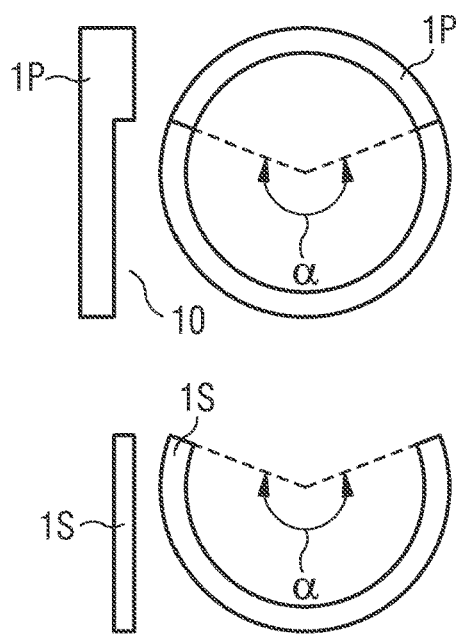
FIG. 6 shows a third embodiment of the mounting ring arrangement according to the invention.

FIG. 6 shows a third embodiment of the mounting ring arrangement 1P, 1S according to the invention. Here, the mounting ring segment 1S subtends an angle α of about 225°, so that its shape (and the shape of the recess 10) describes an arc that is longer than a semi-circle.

Figure 7:
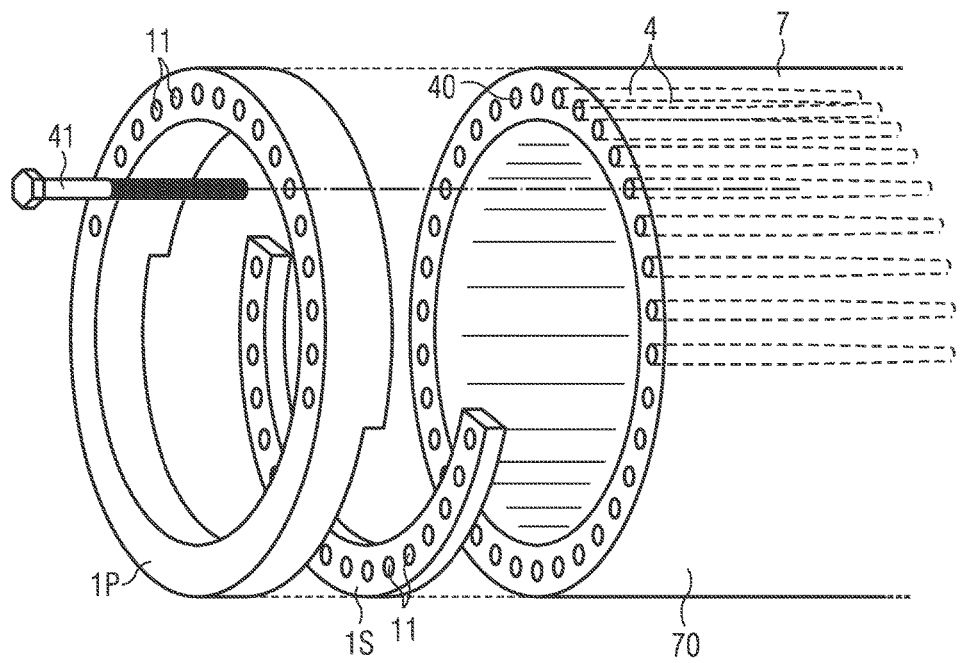
FIG. 7 shows a rotor blade manufactured using the mounting ring arrangement according to the invention.

FIG. 7 shows a root end 70 of a rotor blade 7 manufactured using the mounting ring arrangement 1P, 1S according to the invention. The diagram also shows a stage after the rotor blade 7 has been cured and removed from the mould. For clarity, the components of the mounting ring arrangement 1P, 1S are shown at an angle, and the upper ends of the mounting ring segment 1S may be assumed to be essentially parallel to the top edges of the mould from which it has been removed.

The mounting ring arrangement 1P, 1S is detached from the blade root end 70 by removing the bolts 41 (initially used to secure the root bushing 4 to the partial mounting ring 1P and mounting ring segment 1S) from the bushings 11, revealing root insert bushings 40 which will later be used to mount the blade 7 to a pitch bearing. For clarity, the diagram only shows one such bolt 41 being removed from a bushing 11. The exact placement and alignment of the mounting ring arrangement 1P, 1S in the moulds during manufacture of the blade has resulted in a uniform fibre material thickness and distribution in the root end 70, without any compressed or distorted areas. As mentioned above, push bolts (not shown) can be inserted into the guide bolt bores, after the guide bolts have been removed, to push the partial mounting ring 1P outward from the mounting ring segment 1S to facilitate disassembly of the mounting ring 1P, 1S.

FIG. 8 shows a number of stages I, II, III in the method according to the invention. In a first stage I, the rotor blade halves are being prepared in two moulds M1, M2. A partial mounting ring 1P (with an arrangement of root bushings, not shown; fibre material between the bushings is also not shown for the sake of clarity) is placed at the root end of a first, upper mould M1. A mounting ring segment 1S (also with an arrangement of root bushings, not shown) is placed at the root end of a second, lower mould M2. A gantry 80 spans both blade mould halves M1, M2. A overhanging crane assembly 81 is arranged to traverse the gantry 80, as indicated by the double-ended arrow, and is equipped with holding and turning means 82. When the blade halves are ready, the crane assembly grasps the first mould M1 in a second stage II, turns it over, and lowers it into place on the lower blade mould M2. After resin infusion and curing, the moulds are opened, and the first mould M1 is returned to its original position by the crane assembly 81, which then lifts the finished blade 7 out of the second mould M2 and places it between the now empty mould halves M1, M2. While the finished rotor blade 7 is being worked on, for example to remove the mounting ring arrangement 1P, 1S, the mould halves M1, M2 can be used to prepare another rotor blade.

The bushings 4 can have been connected to the mounting ring segment 1S and the partial mounting ring 1P prior to being placed in the moulds M1, M2. Such preparation of the root section, i.e. preparation of the root bushings 4 and mounting ring 1P, 1S, can be performed in a parallel operation or process step, i.e. independently of the process of laying fibre material in the moulds M1, M2, and independently of the resin infusion/curing steps.

The distance between the mould halves M1, M2 could correspond to the width of one mould M1 or M2, so that the finished blade 7 can be lifted out of the mould M2 and be placed in a fixture. This furthermore provides an intermediate working station for parallel processes like preparing a root section or an inner web for the blade.

Figure 9:
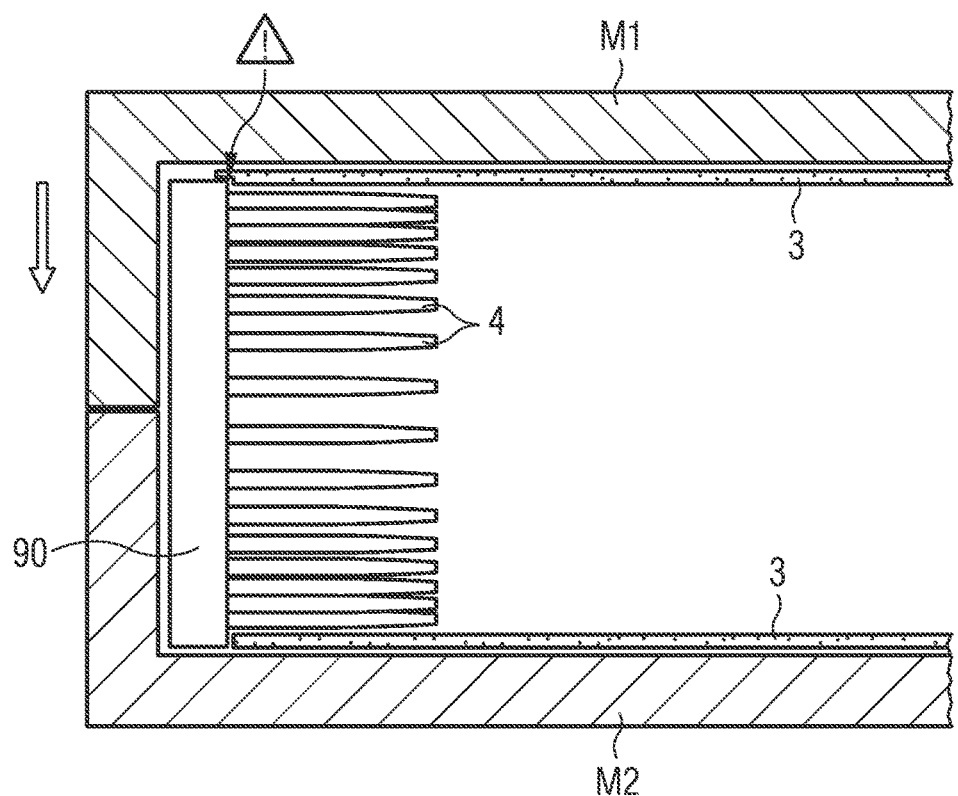
FIG. 9 shows a step in a rotor blade manufacturing process using a prior art mounting ring.

FIG. 9 shows a step in a rotor blade manufacturing process using a prior art mounting ring 90. The prior art mounting ring 80 is a one-piece ring 90, to which all the root bushings 4 must be mounted before placing the loaded ring 90 into one blade mould M2, usually the lower blade mould M2. Great care must be taken when preparing the mounting ring 90 and the bushings 4, in order to be sure that the mounting ring 90 will be correctly aligned when the mould is closed. Great care must also be taken to ensure that the circular arrangement of bores for the root bushings is correctly placed relative to the blade, so that the rotor blade can later be precisely mounted to the wind turbine hub. Furthermore, when the upper blade mould M1 is inverted and placed over the lower blade mould M2, a compression or displacement of fibre material 3 can occur in the region of the root bushings 4 or the moulding ring 90, as indicated by the warning symbol in the diagram. Later, after infusion and curing, such compressed or distorted areas can lead to structural weakness in the rotor blade.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A mounting ring arrangement adapted for alignment of root bushings in a wind turbine rotor blade root end during a rotor blade assembly step, the mounting ring arrangement comprising:
    a mounting ring segment in a shape of an arc segment of an annulus and configured to support a plurality of ring segment root bushings that form a first portion of an annular array of root bushings; and
    a partial mounting ring, comprising a closed annular body and a recess in the shape of the arc segment and dimensioned to accommodate the mounting ring segment therein, wherein the partial mounting ring is configured to support a plurality of mounting ring root bushings that form a second portion of the annular array of root bushings between an inner diameter and an outer diameter of the closed annular body,
    wherein when the mounting ring segment is positioned in the recess, the first portion and the second portion form the annular array of root bushings.

2. The mounting ring arrangement according to claim 1, wherein the mounting ring segment extends over an angular range of at least 90°.

3. The mounting ring arrangement according to claim 1, further comprising
    a connection for connecting the mounting ring segment to the partial mounting ring to complete a full mounting ring.

4. The mounting ring arrangement according to claim 3, wherein the connection comprises a first guide formed in the partial mounting ring and a corresponding second guide formed in the mounting ring segment, wherein the corresponding second guide is arranged to align with the first guide.

5. The mounting ring arrangement according to claim 3, wherein the connection comprises a guide bolt for aligning the mounting ring segment to the partial mounting ring.

6. The mounting ring arrangement according to claim 3, wherein the connection comprises a tightening bolt for securing the mounting ring segment to the partial mounting ring.

7. The mounting ring arrangement according to claim 1, wherein with respect to an axial extent of the mounting ring arrangement a thickness of the mounting ring segment comprises at least 10%, of a thickness of the mounting ring arrangement when assembled.

8. The mounting ring arrangement according to claim 1, further comprising
    a number of through-holes realized for connection of a number of root bushings to the mounting ring segment and/or to the partial mounting ring.

9. The mounting ring arrangement according to claim 1, further comprising
    a fastener adapted to connect the partial mounting ring to a blade mould.

10. A rotor blade mould comprising
    a corresponding opening for securing the rotor blade mould to a component of a mounting ring arrangement according to claim 1.

11. A method of manufacturing a wind turbine rotor blade, comprising
    (A) arranging a fibre layup in a first blade mould and arranging a fibre layup in a second blade mould;
    (B) arranging the partial mounting ring of a mounting ring arrangement according to claim 1 in the first blade mould and arranging the mounting ring segment of the mounting ring arrangement in the second blade mould;
    (C) joining the first and second blade moulds such that the partial mounting ring and the mounting ring segment join to form a full mounting ring arrangement.

12. The method according to claim 11, further comprising inserting fasteners through a number of guides of the mounting ring arrangement and tightening the fasteners to secure the mounting ring segment to the partial mounting ring.

13. The method according to claim 11, wherein the step of joining the first and second blade moulds is performed by an overhanging crane.

14. The method according to claim 11, wherein the mounting ring segment is arranged in the first blade mould at a distance offset from its final position in a complete mounting ring.

15. A rotor blade manufactured using the method according to claim 11.

16. The mounting ring arrangement according to claim 1, wherein the mounting ring segment extends over an angular range of at least 120°.

17. The mounting ring arrangement according to claim 1, wherein with respect to an axial extent of the mounting ring arrangement a thickness of the mounting ring segment comprises at least 20% of a thickness of the mounting ring arrangement when assembled.

18. The mounting ring arrangement according to claim 1, wherein the plural mounting ring root bushings are aligned with an axial extent of the closed annular body.

19. The mounting ring arrangement according to claim 1, the partial mounting ring further comprising an annular first end and a second end opposite the annular first end, wherein the annular first end of the partial mounting ring defines an annular first end of the mounting ring arrangement, wherein when the mounting ring segment and the partial mounting ring are assembled together, the second end of the partial mounting ring and the mounting ring segment define a second annular end of the mounting ring arrangement.

20. The mounting ring arrangement according to claim 1, the mounting ring segment further comprising a ring segment end face, and the partial mounting ring further comprising a mounting ring end face, wherein when the mounting ring segment and the partial mounting ring are assembled together the ring segment end face and the mounting ring end face are flush with each other and define an annular end face of the mounting ring arrangement.

* * * * *